July 3, 1923.

S. E. ALLWRIGHT

GAUGE

Filed Sept. 28, 1922

1,460,563

Inventor
Sidney E. Allwright
By
Hardway & Cath
Attorneys

Patented July 3, 1923.

1,460,563

UNITED STATES PATENT OFFICE.

SIDNEY E. ALLWRIGHT, OF HOUSTON, TEXAS.

GAUGE.

Application filed September 28, 1922. Serial No. 591,063.

*To all whom it may concern:*

Be it known that I, SIDNEY E. ALLWRIGHT, citizen of the United States, residing at Houston, in the county of Harris and State of Texas, have invented certain new and useful Improvements in a Gauge, of which the following is a specification.

This invention relates to new and useful improvements in a gauge.

One object of the invention is to provide a gauge specially designed to be used for adjusting the fly wheel of a Ford automobile relative to the coil spools of the magneto. The coils of the magneto of a Ford automobile are carried on a fixed ring-like coil support and the magnets are carried by the fly wheel and revolve therewith relative to the coils. The adjustment between the fly wheels and the coils should be such that the faces of the magnets will be separated from the surfaces of the coil spools one thirty second of an inch. The fly wheel is bolted to an end flange of the crank shaft and in order to obtain the exact adjustment it is often necessary to interpose thin shims between said flange and fly wheel. If too many shims are used the magnets will be too far from the coil spools and if not enough shims are used said magnets will be too close to the coil spools so that in ordinary practice the fly wheel must be bolted onto the flange and if it is not then the proper distance from the spools it must be removed and additional shims added or removed. This usually requires the removal of the fly wheel, and its replacement a number of times to get the exact adjustment. Inasmuch as the fly wheel is heavy it is a laborious task to adjust it. The device herein described has been devised for the purpose of obtaining the proper adjustment without the necessity of fastening the fly wheel into place and then removing it one or more times in order to get the proper adjustment.

Another object of the invention is to provide a simple gauge which may be cheaply and easily manufactured and which is convenient in use.

With the above and other objects in view the invention has particular relation to certain novel features of construction and use, an example of which is given in this specification and illustrated in the accompanying drawings, wherein:—

Figure 1:
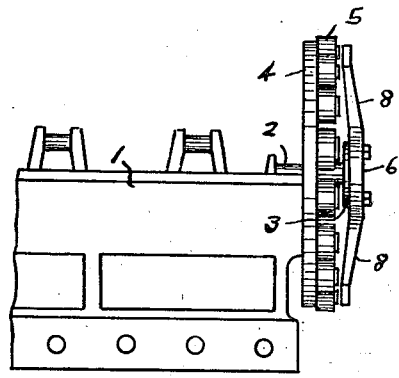
Figure 1 is a fragmentary side view of the motor block, showing the magneto coil support attached thereto and the gauge applied as in use.
Figure 2:
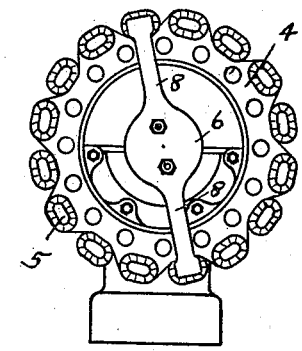
Figure 2 shows a rear view thereof.
Figure 3:
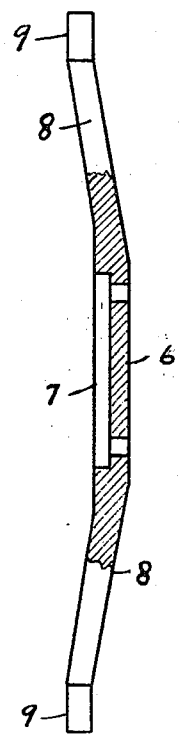
Figure 3 shows an edge view partly in section of the gauge.
Figure 4:
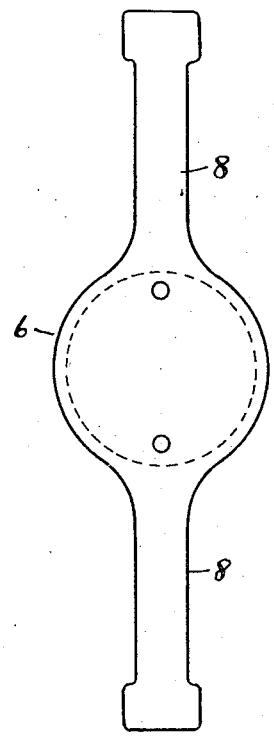
Figure 4 shows a plan view thereof.

In the drawings, the numeral 1 designates the motor block, and the numeral 2 designates the crank shaft whose rear end carries the circular flange 3 which is formed integrally therewith. To this flange the fly wheel is bolted. The numeral 4 designates the magneto coil support. Fastened to the rear face of this support are the magneto coil spools 5 arranged in a circular row, as shown in Figure 2. The spools 5 support the coils proper. The inner face of the fly wheel carries the magnets and has a central circular socket to receive the flange 3. This construction is well known to those familiar with the Ford magneto. When the fly wheel is fastened to the flange 3 the faces of the magnets should be spaced from the coil spools one thirty second of an inch. It is difficult to get this nice adjustment, and thin shims must be interposed between the flange 3 and the fly wheel in order to obtain the proper adjustment. In order to determine the number of shims required, without the necessity of actually fastening the fly wheel to the flange 3, I have provided the gauge which will now be described: Said gauge has a central plate 6 approximately circular and provided with a circular socket 7 to receive the flange 3. Opposing arms 8, 8 are formed integrally with the plate 6 and when the gauge is bolted to said flange 3 the free ends of said arms will lie opposite opposing coil spools. The opposing faces 9, 9 of the free ends of said arms lie in the same plane and are ground smooth. By the use of shims, this gauge may be adjusted until the faces 9, 9 are spaced from the coil spools one thirty second of an inch. The edge contour of the gauge is the same as a cross sectional contour of the fly wheel and when the proper adjustment is obtained the gauge may then be removed and the fly wheel bolted onto the flange 3 and the faces of the magnets of the fly wheel will then be spaced the same distance from the coil spools as the faces 9.

What I claim is:—

A one-piece gauge formed with a central plate having a circular socket and radiating arms carried by said plate the free ends of said arms being formed with smooth faces lying in a plane perpendicular to the axis of said circular socket.

In testimony whereof I have signed my name to this specification in the presence of two subscribing witnesses.

SIDNEY E. ALLWRIGHT.

Witnesses:
E. V. HARDWAY,
W. H. DUNLAY.